(12) United States Patent
Lawrence et al.

(10) Patent No.: US 7,561,967 B2
(45) Date of Patent: Jul. 14, 2009

(54) NAVIGATION RECEIVER WITH FUNCTIONAL EXTENSIBILITY

(75) Inventors: David G. Lawrence, Santa Clara, CA (US); Michael L. O'Connor, Redwood City, CA (US)

(73) Assignee: Novariant, Inc., Fremont, CA (US)

( * ) Notice: Subject to any disclaimer, the term of this patent is extended or adjusted under 35 U.S.C. 154(b) by 608 days.

(21) Appl. No.: 11/193,644

(22) Filed: Jul. 29, 2005

(65) Prior Publication Data

US 2007/0027627 A1 Feb. 1, 2007

(51) Int. Cl.
*G01C 21/00* (2006.01)
(52) U.S. Cl. .................................. 701/213; 701/200
(58) Field of Classification Search .............. 701/200, 701/213–215; 710/1–3
See application file for complete search history.

(56) References Cited

U.S. PATENT DOCUMENTS

| | | | |
|---|---|---|---|
| 5,717,596 | A | 2/1998 | Bernard et al. |
| 5,949,975 | A | 9/1999 | Batty et al. |
| 6,223,212 | B1 | 4/2001 | Batty et al. |
| 6,701,378 | B1 | 3/2004 | Gilhuly et al. |
| 6,727,918 | B1 | 4/2004 | Nason |
| 6,728,896 | B1 | 4/2004 | Forbes et al. |
| 6,753,873 | B2 | 6/2004 | Dixon et al. |
| 6,807,529 | B2 | 10/2004 | Johnson et al. |
| 7,028,113 | B2 * | 4/2006 | Tanaka ................. 710/62 |

OTHER PUBLICATIONS

"Two on One An application Programming Interface hosts Precision Guidance Controller on the GPS Receiver and Helps Reduce Soil Compaction," by GPS World—Designing and Implementing Solutions With Global Positioning Technologies; www.gpsworld.com; Jan. 2004; pp. 14-18.
Operating System Solutions—Running Windows of Linux/UNIX Software on a Macintosh and Running Mac OS on other Platforms; Operating Systems: WIN/Unix on Mac, Mac on Others; http://www.macwindows.com/emulator.html: printed on May 2, 2005; 13 pages.
Tractors and Machinery for Agriculture and Forestry—Serial Control and Communications Data Network—Part 6 Virtual Terminal; International Organization for Standardization, 2000 and pp. 150-11783.
"GPS (Global Positioning System) Solution," Chaeron Corporation; Enterprise System Solutions; located on http://www.chaeron.com/gps.html; 4 pages; printed on Jul. 25, 2005.
"Open Source GPS, A Starting point for learning about GPS with Open Source Software," by Joel Barnes et al.; located on http://home.earthlink.net/cwkelley/; 8 pages; printed on Jul. 25, 2005.

(Continued)

*Primary Examiner*—Yonel Beaulieu
(74) *Attorney, Agent, or Firm*—Brinks, Hofer, Gilson & Lione

(57) ABSTRACT

A global navigation satellite system receiver manufacturer provides functional extensibility to a global navigation satellite system receiver. An application programming interface to the receiver is provided. The interface is public, such as using pubically available software or pubically distributed instructions, for loading on applications or other extensions to the core functionality of the GPS receiver. Other programmers than the manufacturer may add applications to the GPS receiver, avoiding separate devices in a vehicle.

21 Claims, 1 Drawing Sheet

OTHER PUBLICATIONS

Worldwide Digital Global Positioning Service—Omnistar USA, Inc. (Services, Activation Setup and Frequently Asked Questions); located on http://www.omnistar.com/services.html; 13 pages; printed on Jul. 25, 2005.

"Real-Time L1 and L1/L5 GPS Software Receivers," Dr. Brent M. Ledvina; located at http://gps.ece.cornell.edu/; 6 pages; printed on Jul. 25, 2005.

iQue 3600—The Smart Way to Navigate Your Day (iQue Technology, iQue High-Tech Integration, iQue Reliable Navigation and iQue Detailed Mapping); by Garmin Mobile Electronics; located at http://www.garmin.com/products/iQue3600; 6 pages; printed on Jul. 25, 2005.

* cited by examiner

NAVIGATION RECEIVER WITH FUNCTIONAL EXTENSIBILITY

BACKGROUND

This present embodiments relate to navigation receivers, such as global positioning satellite (GPS) receivers. GPS receivers typically output standard parameters such as time and position. GPS receivers may be used to control vehicles using proprietary software developed by the receiver manufacturer or a partner. Quite often however, there are new applications for GPS receivers that require data manipulation not performed by any existing receiver. Frequently these applications are implemented by connecting the GPS receiver to an external computer. This external computer performs some processing and outputs data or control commands. Many navigation systems that require a user display have been implemented by connecting a computer (e.g., a Wintel laptop) or personal data assistant (PDA) with a publicly defined application programming interface (API).

Application solutions that can provide high enough revenue are frequently provided by GPS receiver manufacturers, sometimes by entering into proprietary agreements with partners. The manufacturer and/or partner typically develop proprietary software to solve the problem. For example, a third party enters into an agreement to obtain a GPS receiver source code and modify the source code for implementing an application. For example, Omnistar differential corrections are derived from multiple base stations and are broadcast to users via a geosynchronous satellite. Omnistar implements the algorithms that use the corrections to improve the position accuracy. Receiver vendors link the compiled Omnistar software with their own receiver software to use the Omnistar corrections and achieve decimeter-level accuracy without a local base station. Proprietary binary modules may be provided to GPS receiver manufacturers to implement an application, such as a wide-area differential GPS algorithm. These modules are loaded by the manufacturers. In other cases, a new receiver is developed.

Example source code for GPS RF and correlator chips and reference designs for a GPS receiver that used their chips have been provided for marketing. An ISA card with GPS receiver built onto the card is marketed. That "GPS Builder" card was plugged into a PCs ISA bus. With software running on the PCs processor, the PC/GPS Builder combination was a GPS receiver. Example PC software and example schematics and layouts for the GPS Builder design were provided. Anybody who purchased the GPS builder could plug it into a computer and run the GPS builder software. They could also modify or completely replace the software to add their own functionality. This software did not run under DOS or any other commercial PC OS. Other software implementations are available for the GPS builder including one that uses Linux as the operating system.

Some PDAs have GPS functions. Applications are implemented by adding software to the PDA using public software APIs. For example, an application for a moving map is created on a WinCE GPS-enabled PDA. Many GPS receivers have a serial interface that allows an external computer to have access to GPS receiver navigation outputs such as position, velocity, and time. Often there is also serial access to lower level measurements, such as phases and satellite ephemeris. One way to construct a system with extended navigation functions is to put that software on a laptop, a tablet PC, or even a desktop computer. Extended navigation software may be added by a third party to a laptop using a combination of the public Interface Control Document for the serial stream from the GPS receiver vendor and the public API for the PCs operating system.

GPS software receivers are being developed where much of the functionality traditionally implemented in ASICS or similar digital correlators is implemented in software. The software source code for some implementations is open source. For example, Linux software for the GPS Builder is available.

BRIEF SUMMARY

The present invention is defined by the following claims, and nothing in this section should be taken as a limitation on those claims. By way of introduction, the preferred embodiments described below include methods, systems and computer readable media for a global navigation satellite system receiver manufacturer to provide functional extensibility to a global navigation satellite system receiver. An application programming interface to the receiver is provided. The interface is public, such as using pubically available software or publically distributed instructions, for loading on applications or other extensions to the core functionality of the GPS receiver. Other programmers than the manufacturer may add applications to the GPS receiver, avoiding adding separate devices in a vehicle.

In a first aspect, a method is provided for a global navigation satellite system receiver manufacturer to provide functional extensibility to a global navigation satellite system receiver. A proprietary receiver firmware component operable to implement a core navigation feature is provided on the receiver. A software interface to the receiver firmware with extensibility hooks is also provided on the receiver. A dynamic loader is provided and is operable to add functional extensions that adhere to the software interface to run on a processor in the receiver.

In a second aspect, a method is provided for a global navigation satellite system receiver manufacturer to provide functional extensibility to a global navigation satellite system receiver. A software interface has extensibility hooks to the global navigation satellite system receiver. A public firmware image has undefined functions to be linked with one or more additional modules to successfully execute. First public tools, first directions or both first public tools and first directions are provided to compile a function extension module from source code. Second public tools, second directions or both second public tools and second directions are provided to link one or more function extension modules with the partial firmware image. A complete firmware image results from linking the one or more function extension modules with the partial firmware image. Third public tools, third directions or both third public tools and third directions are provided to load the complete firmware image into the global navigation satellite system receiver.

In a third aspect, a method is provided for a global navigation satellite system receiver manufacturer to provide functional extensibility to a global navigation satellite system receiver. A proprietary receiver firmware component is operable to implement a core navigation feature on the receiver. A software interface with extensibility hooks is provided. The extensibility hooks comprise access to navigation metrics derived from an output of the core navigation feature. With the software interface, different functions supported by the receiver are allowed to be subsequently added to the receiver independently of the receiver manufacturer.

In a fourth aspect, a method is provided for a global navigation satellite system receiver manufacturer to provide another with functional extensibility to a global navigation satellite system receiver. On the receiver, a proprietary receiver firmware component is provided and is operable to implement a core navigation feature. On the receiver, a public software interface with extensibility hooks is provided. The extensibility hooks provide (a) access to navigation metrics derived from an output of the core navigation feature and (b) access to one or more receiver output interfaces.

In a fifth aspect, an improvement in a global navigation satellite system receiver is provided. A computer readable storage media in the receiver has instructions for a programmed processor to implement an integrated compiler.

In a sixth aspect, a global navigation satellite system receiver is provided. The receiver includes computer readable media with instructions for a source interpreter for executing source and for a source loader for loading source.

In a seventh aspect, a global position satellite receiver is provided. A processor connects with an antenna connector and a data input. The processor is operable to run satellite signal tracking code as a function of signals from the first satellite antenna connector and operable to run a public application programming interface for software provided by the data input.

Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A navigation system includes a GPS receiver with a public software API for loading software, such as third party software. For example, the public API allows writing software to interface with the receiver's navigation software. In one embodiment, the public API is a serial interface control document (ICD) modified to communicate through an interprocess communication mechanism, such as a FIFO, shared memory, TCP or UDP sockets, or message boxes. A single processor in the receiver or a single receiver running a real-time Linux variant or other operating system includes function extensions via dynamic loading of new quantum framework actors or other interfaces.

The public API provides an interface to read low-level GPS observables (e.g., carrier phase, code phase, or ephemeris), to read processed GPS navigation data (e.g., as position, time, and attitude) and/or to communicate with integrated devices such as inertial measurement units, universal serial bus (USB) devices, LEDs, buttons, Ethernet, power control, nvmem, analog-to-digital converters, digital-to-analog converters, CANbus, or other devices. Included in the public interface may be an interface to a resource manager for resource contention for interfaces to the devices. For example, there may be a function call to request access to a CANbus device. The public API may allow compiling the software (e.g., specifies a version of the Gnu Compiler Collection compiler to use). The public API may allow for loading or unloading the software. This may provide the ability to load a plurality of applications provided by different third parties.

Since the GPS receiver may be positioned in a vehicle (e.g., tractor, construction vehicle, boat, airplane, car, train), the GPS receiver may be used for navigation, for any applications using navigation information, and for any other applications even unrelated to navigation. The applications are added by the manufacturer or third parties.

Figure 1:
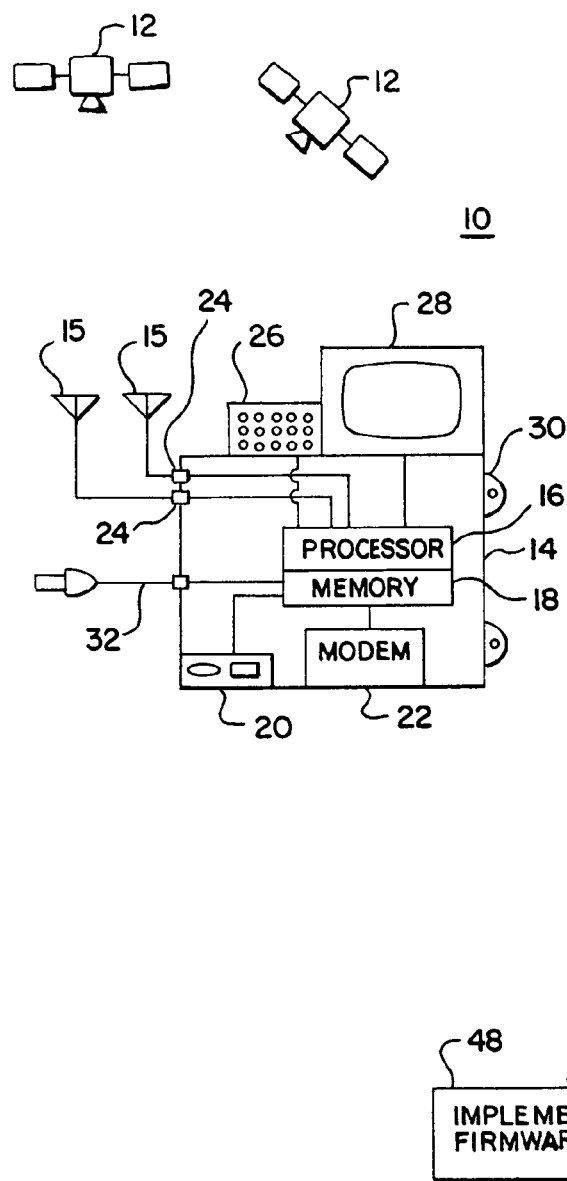
FIG. 1 is a block diagram of one embodiment of a global positioning system with a receiver.

FIG. 1 shows satellite navigation system 10. The system 10 includes a plurality of satellites 12, antennas 15 and at least one satellite navigation receiver 14. Additional, different or fewer components may be provided. In one embodiment, the system 10 is the Global Positioning System, GLONASS, Galileo, Iridium, or another now known or later developed satellite navigation system. In other embodiments, the system 10 additionally includes pseudo-satellites (i.e., pseudolites) or other ground-based transmitters, such as Terralites.

The receiver 14 is a now known or later developed device for tracking satellite signals and/or determining position from satellite signals. The receiver 14 includes a processor 16, a memory 18, a data port 20, a modem 22, antenna connectors 24, a user input 26, a display 28, a housing 30 and a power connector 32. Additional, different or fewer components may be provided. For example, a battery is used to power the receiver 14 instead of or in addition to the power connector 32.

The receiver 14 includes single frequency tracking or additional features for improved navigation determination. For example, the receiver 14 is a multi-frequency GPS receiver that tracks two or three frequencies, such as combination of L1, L2 and/or L5 GPS frequencies. The use of two frequencies allows for advanced navigation techniques, which improve performance, including accuracy. Multi-frequency also applies to other signals which may be available today, or may become available in the future, such as psuedolite or other non-GPS satellite signals.

The antenna connectors 24 are electrical and physical connectors, such as plugs, for connecting the antennas 15 to the receiver 14. Alternatively, the connectors 24 are holes or other structure allowing antenna cable to connect with the receiver 14. In one embodiment, a single connector 24 is provided, but two, three or more connectors may be provided. Using multiple antenna connectors 24, carrier phase tracking is performed for a plurality of antennas 15. The relative position of some or all of the antennas 15 is calculated, providing attitude information. Where the antennas are mounted on a (substantially) rigid body, the orientation of that body can be calculated from position determination of the multiple antennas 15. Three or more antennas 15 and associated connectors 24 enable determination of 3 dimensions of orientation (e.g., roll, pitch, and heading), and two antennas 15 and associated connectors 24 enables determination of two dimensions of orientation (e.g., roll and heading).

The data input 20 is a bus, CAN, Ethernet, USB, serial device, digital-to-analog outputs, analog-to-digital inputs, diagnostic lights, buzzer and flash memory, Wi-Fi, Blue-Tooth, 802.11b, RS232, RS422 or any other now known or later developed device, network connector, buss connector or format for inputting data, such as software applications. In another embodiment, the data input 20 includes a removable media device, such as a magnetic, RAM or optical storage device. For example, software is reloaded from a USB storage media probed on startup for new user libraries. New libraries are copied over the old ones. Buggy user code can always be reloaded because probing occurs before user code executes. A system designed to allow third party system integrators to run their own software on the receiver 14 or navigation display may be useful for more applications if several wired and/or wireless communications standards are integrated in the data input 20.

The display 28 is a touch screen, LCD, monitor, projection, plasma, LED, printer or other now known or later developed device for outputting navigation or other information. Grey scale or color display may be used. The display 28 electronically connects with the processor 16 for outputting navigation information and/or information from other applications loaded onto the receiver 14. The display 28 is connected with or shares a same housing as other components of the receiver 14. Alternatively, the display 28 is in a separate housing connected with the receiver 14 by a cable or wirelessly. In another embodiment, the display 28 is a shared display, such as an LCD provided for vehicle functions.

The display 28 is one output interface responsive to the processor 16 and associated navigation code and source or other code run by the processor 16. The data input 20 may support data output as well, providing another output interface for the receiver 14.

The user input 26 is a keyboard, touch screen (e.g., part of the display 28), button, slider, knob, touch pad, capacitive sensor, combinations thereof or other now known or later developed input device. The user input 26 is used to control navigation or other application functions, such as for switching output displays or formats. In one embodiment, the user input 26 allows user control of the installation or loading of software by the processor 16. User input to control operation of the receiver 14, including any loaded applications, is provided by the user input 26.

The power connector 32 is a power input connected with the processor 14 and connectable with a vehicle. For example, the power connector 32 includes a cable with terminals for connecting with the wiring harness, alternator or battery of the vehicle. The processor 16 and the display 28 may have no or limited internal power supply other than clock or capacitive based batteries, so the vehicle power is used through the power connector 32. The display 28 and/or receiver 14 operate when integrated with a vehicle. Since the vehicle typically has a battery and alternator, the power electronics for the receiver 14 and display 28 may be free of a bulky integrated battery. Instead of battery doors and/or recharging control circuitry, circuits for conditioning the power from the vehicle are used. Alternatively, a battery is provided for operation without vehicle power (e.g., vehicle power only charges the battery) or for operation without any connection to the vehicle power.

The modem 22 is an integrated radio modem for local use or a satellite modem for communicating with a satellite, such as a low earth orbit satellite. The modem 22 provides a data link for differential corrections to be used by the processor 16. Differential signals for real-time kinematic (RTK), LAAS or wide area (e.g., WAAS, Omnistar, or Starfire) position or tracking corrections are communicated from or to the modem 22. With the modem 22, the receiver 14 is able to incorporate raw measurements or error corrections from one or more reference stations. This provides improved performance, including accuracy.

Other devices may be included in the receiver 14, such as integrated inertial measurement units (IMUs). IMUs complement the measurements provided by the satellite signals. While satellite signals may provide position information with a relatively limited bandwidth and subject to satellite visibility requirements, an IMU provides high bandwidth measurements of acceleration. Integrating the two classes of sensors may overcome some of the limitations of both systems and provide high bandwidth positions, potentially even during periods of poor satellite visibility.

The housing 30 is plastic, fiberglass, wood, metal, epoxy, glass, combinations thereof or other now known or later developed material. All or some of the devices of the receiver 14 are on or within the housing 30. For example, the processor 15, the data input 20 and the satellite antenna connectors 24 are on or within the housing 30. The housing 30 and associated receiver components are operable over a specified minimum, maximum or range of temperature, acceleration, shock and vibration values. For example, the receiver 14 and housing 30 operate between −30 and +70 degrees Celsius and in a vibration environment of 4 grms, 20 to 1200 Hz. The specifications are provided with the receiver 14 for determining proper installation environments. A specified environmental robustness supplied with published manufacturer's specifications allow for proper use in difficult environments, such as mining, military or farming environments. The housing 30 is environmentally sealed, such as being bolted or screwed closed with gaskets or rings for preventing liquid, air, gas, dust or other materials from entering the receiver 14. In alternative embodiments, standard specifications or no specifications are provided, such as for use of the receiver 14 as a consumer product (e.g., non "ruggedized" products).

The housing 30 includes holes, tabs, latches, hooks, or other structure for mounting to or integrating with a vehicle. The structure for mounting may include devices to minimize vibration, such as a bolt with a rubber vibration isolating gasket or spacer. The mounting is semi-permanent, such as by a vehicle manufacturer or by an installer. Alternatively, a removable mounting is provided, such as using Velcro.

The memory 18 is a computer readable storage media. Computer readable storage media include various types of volatile and non-volatile storage media, including but not limited to random access memory, read-only memory, programmable read-only memory, electrically programmable read-only memory, electrically erasable read-only memory, flash memory, field programmable gate array memory, cache, magnetic tape or disk, optical media and the like. The memory 18 stores navigation data for or during processing by the processor 16. For example, code and/or carrier phase measurements are stored for determining position by the processor 16.

The memory 18 also or alternatively has stored therein data representing instructions executable by a programmed processor, such as the processor 16. The automatic or semiautomatic operations discussed herein are implemented, at least in part, by the instructions. The instructions are for navigation functions and/or any added applications. The functions, steps, acts or tasks illustrated in the figures or described herein are performed by the programmed processor 16 executing the instructions stored in the memory 18 or a different memory. The functions, acts or tasks are independent of the particular type of instructions set, storage media, processor or processing strategy and may be performed by software, hardware, integrated circuits, film-ware, micro-code and the like, operating alone or in combination. Likewise, processing strategies may include multiprocessing, multitasking, parallel processing and the like.

The processor 16 is a one or more general processors, digital signal processors, applications specific integrated circuits, field programmable gate arrays, digital circuits, analog circuits, combinations thereof or other now known or later developed devices for tracking navigation signals and/or determining position. In one embodiment, the processor 16 includes one or more chips designed for correlating or tracking satellite signals and one or more field programmable gate arrays or other general processing devices for determining navigation information from the tracked or correlated signals. Other embodiments are possible. The processor 16 operates pursuant to firmware, software, source code, binary code, hardware design or other sources of instructions. The processor 16 operates pursuant to proprietary signal tracking and navigation software, third party application code (e.g., run on the same processing device or on a display processor), a public API for running the application code, software for loading applications, coding to prevent added applications from interfering with one another and/or other coding in the receiver 16.

The processor 16 connects with the antenna connectors 24, the data input 20, and/or other components using a bus, direct connections or other structures. The connections allow the processor 16 to acquire satellite signals, load additional applications, control interface devices, output data or perform other functions. For example, the processor 16 operates pursuant to a real-time version of the Linux, Windows or other operating system.

The processor 16 is operable to implement one or more core navigation functions. Core navigation functions include position, speed, orientation, time, satellite signal strength, carrier phase, code phase, signal corrections, ephemeris, satellite synchronization information, and/or other values output for satellite navigation.

The processor 16 runs firmware for satellite signal tracking code to track satellite signals from one or more of the satellite antenna connectors 24. The tracking code is public or proprietary. Signal tracking software is an application or a module within an application which interfaces with signal tracking hardware. Signal tracking hardware is designed to track radio frequency (RF) signals, such as global navigation satellite signals, pseudo-satellite (pseudolite) signals, or other RF signals which may or may not be designed to be used for navigation. The software is generally responsible for collecting measurements from the signal tracking hardware, sending commands to the signal tracking hardware, and may be responsible for performing position computations. This software generally handles the logic for functions such as signal acquisition. The raw measurements generated from the signal tracking software may include code phase measurements and carrier phase measurements.

The processor 16 is operable to provide navigation information responsive to the satellite signal tracking code. For some navigation applications, the measurements from the signal tracking software are passed to another software module or application which runs the navigation software. The navigation software processes the raw measurements and computes the position of the navigation antenna. In the case of GPS, an accuracy in position may be from 50 meters to 1 centimeter or better. To improve the solution accuracy, the navigation software may incorporate data collected by one or more non-collocated navigation receivers (e.g. WAAS, Differential GPS, or RTK GPS). This data may be pre-processed, as in the case of WAAS, or it may be raw data, such as for differential GPS or RTK GPS. The navigation software typically produces measurements in the form of 3-D position (e.g., Latitude/Longitude/Altitude or East/North/Up) relative to some coordinate frame (such as WGS-84). This software may also produce measurements of velocity (speed), orientation (such as heading/roll/pitch), time, or other information about the state of the user that can be measured using a navigation receiver.

Other information based on the core navigation functions may be generated and/or output by the processor 16. For example, the position is used to determine the antenna 15's position on a map, provide driving instructions to a user based on position, log the antenna's location to a data device, control some aspect of a vehicle (e.g., steering, rate of agricultural chemical spraying, implement height or other applications) based on the navigation information, show the proximity of the user to other points of interest, or other now known or later developed uses. The software for implementing these additional functions is another module or application running on the same hardware platform (i.e., the receiver 16) with the same operating system software.

These other navigation related applications and/or non-navigation related applications are run by the processor 16. The processor 16 runs the core navigation software and a user-loadable library adhering to a public API allowing low-latency software access to the processor 16. The same or different devices of the processor 16 are used for the different software purposes. Software may be provided via the data input 20 to the memory 18 and/or processor 16 pursuant to the public application programming interface (API). Any public API format may be used, such as a publish/subscribe API like Quantum Framework with the user dynamic link library of one or more modular actors. Multiple third party applications may be added to the receiver 14. The software is added by the receiver manufacturer, a purchaser of the receiver 14 or other person. For example, frequently requested applications are posted on web site for download to the receiver 14.

Other non-navigation related applications may be loaded onto the receiver 14. For example, word processing software, database software, game software or other applications are loaded for running on the receiver 14. The navigation software runs on the same operating system software with other applications or modules. The non-navigation related applications are loaded with the public API, but do not use the navigation information.

The public API allows for loading non-navigation applications and applications that use outputs of the core navigation features. For example, an automatic steering application is loaded onto the receiver 14. The automatic steering application accesses position and/or attitude information from the core navigation features through an interface defined by the public API.

Other interprocess communications may be provided, such as defining the public API to access a vehicle control system. The vehicle control system with electronic interfaces may receive input data. However, the receiver 14 may not be specifically designed to perform a vehicle control function, such as steering the vehicle (e.g. a farm tractor) or actuating an implement. Steering hardware and firmware are either built into the vehicle, or are enclosed in a package which is separate from the receiver 14. The firmware is added to the receiver 14 for providing signals to the built in steering of the vehicle or to hardware added to steer the vehicle. In one embodiment, the data input 20 includes analog-to-digital converters and/or digital-to-analog converters for a wheel angle sensor or other input or output. To turn the wheel, a voltage output by a digital-to-analog converter might be sent to a voltage-driven hydraulic actuator.

To provide the public API and allow addition of different software to the receiver 14, the processor 16 is operable to manage resource contentions for the software. Inputs, outputs, displays, interfaces and/or processing may be desired by different applications at different times. Any resource contention management may be used, such as providing access based on request time or an assigned priority (e.g., core navigation functions implemented first with other functions acting on a user selected priority or a request time basis).

The proprietary or other software of the receiver 14 may override or prevent operation of added software. For example, the processor 16 checks for COCOMM limits on altitude or speed. Where the limits are exceed, the processor 16 ceases to provide navigation output information. This or other checks are separated from the public application programming interface to avoid alteration.

The receiver 14 may include processes for implementing source code. Source code is loaded onto the receiver 14 instead of binary "machine code" pursuant to the public API. The receiver functionality is extended by integrating a compiler into the receiver 14 or a source interpreter in the receiver (e.g., Java, or matlab). A source file or an archive of source files is loaded into the receiver 14 instead of a binary library, and the receiver 14 compiles or interprets the source.

In one embodiment, an integrated compiler is implemented with software on the receiver 14. The compiler is provided with the receiver 14 or on a disk external to the receiver (for example, a USB flash disk). The compiler executes on a processor in the receiver. After or before the receiver is used or shipped, source code is loaded into the receiver 14. The compiler converts the source into compiled software (i.e., machine code) executable by the receiver 14 or processor 16. The compiler provides a software interface. The interface also defines the interaction between applications. For example, a public firmware image with undefined functions is provided. The compiled application includes function calls or memory reads to obtain navigation information. The integrated compiler compiles a function extension module linking the compiled software to the public firmware image. Extensibility hooks are linked to access a navigation metric derived from the core navigation function by software compiled by the integrated compiler. The processor 16 runs software compiled by the integrated compiler and core navigation functions. Different applications are provided due to the different firmware. The compiled software and the navigation software use the same or different outputs of the receiver 14 pursuant to the firmware image.

In another embodiment, the receiver 14 implements a source interpreter and a source loader. The source loader allows source code to be loaded into the memory 18 and/or processor 16. The source is loaded before or after shipping and/or use of the receiver 14. For running the application provided by the source code, the source interpreter executes the source. The source code is read line by line without compiling or converting to machine code. For example, the source interpreter is a Java or Matlab interpreter resident on the receiver 14. The source interpreter links the source to the public firmware image so that navigation information may be used by the source interpreter for running the source. For example, the source includes function calls to extensibility hooks provided by the firmware image. The software interface between the interpreted source and the receiver 14 provides for communication between navigation functions and the source. The processor 16 implements the source interpreter and runs the software as interpreted by the source interpreter. The processor 16 also runs different applications, such as the core navigation functions. Integrated debugging facilities or applications may be provided on the receiver 14 with the source interpreter to debug the source.

Figure 2:
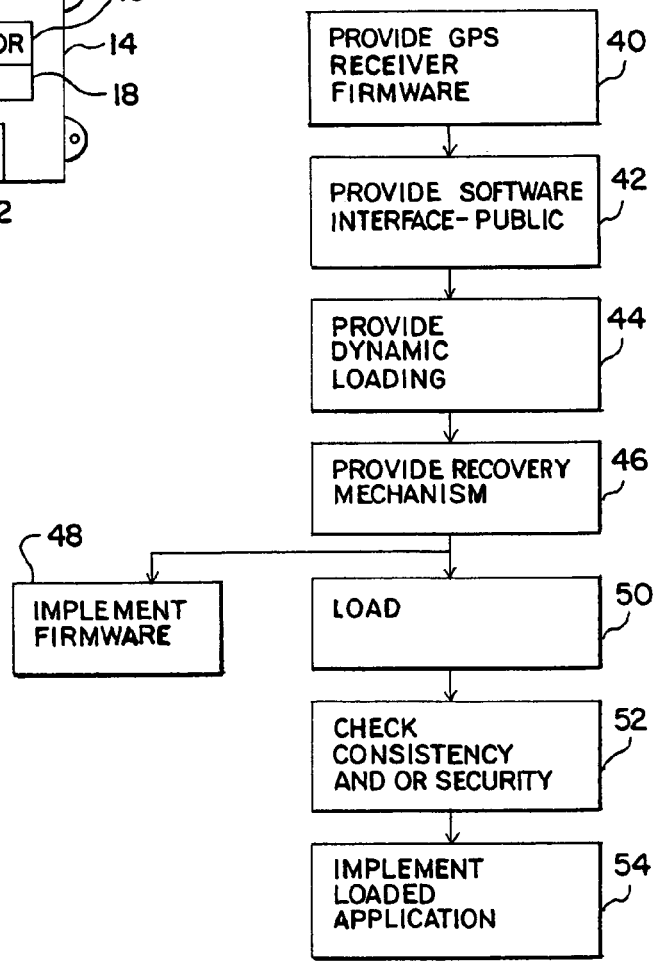
FIG. 2 is a flow chart diagram of one embodiment of a method for a global navigation satellite system receiver manufacturer to provide functional extensibility to a global navigation satellite system receiver.

FIG. 2 shows a method for a global navigation satellite system receiver manufacturer to provide functional extensibility to a global navigation satellite system receiver. The method is implemented using the system 10 or receiver 14 shown in FIG. 1 or a different system or receiver. Additional, different or fewer acts than shown in FIG. 2 may be used. For example, acts 52 or 46 may not be provided. The acts are performed in the order shown or a different order.

In act 40, software to implement a core navigation feature is provided in a receiver. The receiver manufacturer or another loads firmware as data or instructions, as a field programmable gate array configuration, as a programmed application specific integrated circuit. The firmware is proprietary or publicly available.

The core navigation features include measuring a carrier phase, measuring a code phase, carrier phase, tracking a satellite, satellite acquisition searching, or combinations thereof. In addition to information provided by satellite signal tracking code, other core navigation features may include ephemeris, position, velocity, acceleration, attitude, attitude rate, attitude acceleration, or combinations thereof. The core navigation features provide navigation information, such as associated from measuring a phase from a global navigation satellite system satellite or psuedolite to determining position. The core navigation features provide a simple position with civilian code based accuracy. Alternatively, the receiver includes other capabilities for increasing accuracy or other navigation improvements. For example, the core navigation functionality is implemented with multi-frequency capability, local differential global positioning capability, an integrated local differential data link, a network-based global positioning capability (e.g., Omnistar or Starfire satellite distributed differential data), multi-antenna capability, combinations thereof or other features to provide decimeter or better differential global navigation satellite system capability.

The core navigation features are performed without any functional extensions in act 48, such as without additional software added by third parties. The receiver is operational as a navigation receiver without automatic steering, mapping, or other applications extending the functionality of the receiver. The receiver links and runs without the extensions. The receiver also has the ability to implement functional extensions, such as by running additional instructions on the same processor or processors of the receiver.

For extending the functionality of the receiver, a software interface is provided in act 42. The software interface links to the receiver firmware with extensibility hooks. Extensibility hooks in the navigation receiver are provisions for adding more applications, such as with separate processes or separate threads. An extensibility hook provides for a different completely contained application, library function calls, subroutines, modules or other now known or later developed way to operate pursuant to an additional function. The extensibility hooks may provide buffers, memory space, ports or other locations for access by added applications to navigation metrics derived from an output of one or more core navigation functions. The software interface with extensibility hooks may also provide access to one or more receiver output interfaces for sharing between applications, such as sharing a display or data output port. Direct access is provided by the software interface to output interfaces of the receiver in one embodiment, and indirect access via an interface proxy is provided in another embodiment.

The software interface allows the core navigation and extended functions to run on the same receiver. Any now known or later developed technique for running different applications may be used, such as threads sharing a process address space with zero or more other threads. A single application process is viewed as an address space with a single thread. Processes commonly use the processor's memory management unit (MMU) to guarantee that memory errors in one process don't corrupt another process. Every process typically has one and only one "main" function. The complexity of multi-threaded programming and interaction may be minimized by providing a framework for implementing multiple threads, such as the framework provided by the software interface.

Some operating systems have support for separate processes each with their own address space so that the memory of one process is not be contaminated by erroneous memory access in another process. Limits can also be imposed on a process-by-process basis to prevent a process from using too much memory. One way to implement a system that allows third party software or other applications to be loaded onto the same processor as other navigation system functions is to run each third party software module as a process. The processes might communicate to one another through sockets, fifos, or other interprocess communication techniques. The same serial interface that is used between the receiver and an external computer might be used through an analogous virtual port. Any new software module is registered. For example, to load a new module into a Linux-based system, a new executable file is added onto the file-system and the executable file is added to the list of things that start automatically upon boot. In Linux this is traditionally performed by the "init" process. Typically, the init process is the so-called SysVInit. As one of many alternatives, a simple shell script replaces SysVInit as the init process and simply calls each process in turn.

Both processes and threads are scheduled by the operating system to run on the processor based on some scheduling algorithm that allows more than one thread or process to run on the processor substantially simultaneously. Since threads that are part of the same process share the same address space, the threads are not isolated from one another as are separate processes. The time to switch between two threads may be less than the time to switch between two processes. A serial interface between two processes on the same processor may be less flexible than using shared memory. Another way to communicate between two processes whether on the same or different processors is to use an "Object Request Broker" model.

Yet another approach to incorporating third party software or additional applications into a navigation system is to define an interface with functions that the module calls under certain conditions. For example, a function might be called each time a position is calculated by the navigation code. Some functions might be explicitly defined in the interface while others might be registered at runtime as callback functions. More than one callback function might be registered for a given stimulus. For example, two dynamic link libraries might each define a function with the same parameters each to be called when a position fix is available. A linked list of callback functions is maintained by the module management component of the application.

In a similar approach, a simple publish/subscribe interface such as the quantum framework, is used. Each software module might be one or more actors in this framework. The API definition includes signal numbers and event structures (i.e., header and data structures) in addition to an interface to start the actors. For example, the API might define a position event like this:

```
// Signal number
struct PosEvt : public QEvent {
    s32 timetag_;              // msec of GPS week
    u16 GPSweek_;              // GPS week number
    double eastNorthUp[3];     // meters relative to base station
```

-continued

```
    double variance[3];        // m^2
    double cov_A_B___B2_[3];   // m^2
    double pdop_;
    double vdop_;
    double gdop_;
    u8 numSV_;     // Number of satellites used for pos fix
    u8 status_;
    enum StatusFlags {
        BASESTATION_TIMEOUT = 0x01,  // DGPS correction timeout
        FLOAT_SOLUTION = 0x04,       // Integers not fixed
        POSITION_NOT_VALID = 0x40,
        TIME_NOT_VALID = 0x80
    };
    double latitudeRad_;
    double longitueRad_;
    double altitudeMet_;
};:.
```

Another application might subscribe to this message and publish another message based on the content of the position message and information harvested from other events. For example, a chemical application controller module might publish a message to send a message on the CAN bus to signal the applicator hardware to increase the rate of application based on the position.

To start the application, a list of dynamic link libraries, startup functions, and possibly priorities, usernames, checksums or digital signatures and other information is maintained. Such a list might look like:

```
/lib/libchemapp.so.1.0.1 start_chemapp 12 system-integrator1
iD8DBQFB9iSb/FmLrNfLpjMRAp0XAJ4prJCID4vjYsaMlKr/
UyAI6rcY3QCgmYJr
/lib/libmovmap.so.3.2.1 start_movmap 3 enduser
iQBvAwUBO/BigTanThAdit3tAQHj0QLQp8wCPnhr2AqgV7/
Wk/K6WjGEZWYyLSTv
```

In the above example, a library name, a startup function for the library, a priority, a user name, and a signature for that user/library/startup/priority combination are provided.

This text file is read on startup and each dynamic link library could be loaded, and the corresponding start function is called with the assigned priority level. As an example, the C++ code below reads a line from such the file.

```
    void *handle;
    void (*func)(int);
    char *error;
    FILE *fp = fopen("dllist", "r");
    char libname[128], funcname[64];
    int prio;
    fscanf(fp, "%s %s %d", libname, funcname, &prio);
    handle = dlopen (libname, RTLD_LAZY);
    if (!handle) {
        fputs (dlerror( ), stderr);
        exit(1);
    }
    func = (void (*)(int))dlsym(handle, funcname);
    if ((error = dlerror( )) != NULL) {
        fputs(error, stderr);
        exit(1);
    }
    (func)(prio);
```

The dynamic link library is then loaded, and a function based on the data on that line is called. The following code shows how such a function might be implemented to start a quantum framework actor:

```
extern "C" {
void start_chemapp(int prio)
{
static QEvent *chemAppQueueSto[2000];
static ChemAppMgr cam;
cam.start(prio,
   chemAppQueueSto, DIM(chemAppQueueSto), 0, 0, 0);
}
}
```

The initial state may start a timer to go off twice per second and subscribe to position events.

```
//..............................................................
void ChemApp::initial(QEvent const *) {
   timer_.fireEvery(this, TIMEOUT4_SIG, TICKS_PER_SEC/2);
   QF::subscribe(this POS_SIG);
   Q_INIT(&ChemApp::running);
}
//..............................................................
QSTATE ChemApp::running(QEvent const *e) {
   switch (e->sig) {
      case POS_SIG: {
         const PosEvt *pe = (const PosEvt *) e;
         /* Do something based on position info */
         /* ... */
         return 0;
      }
      case TIMEOUT4_SIG: {
         /* Do something twice per second */
         return 0;
      }
   }
   return (QSTATE)&ChemApp::top;
}
```

To register a new application to be added, a third party, the user or the manufacturer adds a line to a text file and adds the new dynamic link library to the file system. To create such a library for a Linux system using the open source compiler gcc, special flags are passed to gcc to generate code suitable for dynamic linking. For example, to generate a shared dynamic link library, the flag "-fPIC" is used to generate "position independent code." Similarly, if the library contains unresolved references to functions defined in the application, the application is compiled with the -rdynamic flag.

The software interface and extensibility hooks allow operation of other software, such as third party software, with different functions on the receiver. A plurality of extensions may be provided, such as by loading a plurality of modules or applications. To allow addition by others without knowledge of any proprietary code, the software interface is published or publically available. The public interface allows for operation of third party software on the global navigation satellite system receiver. Different functions are supported by the receiver, so may be subsequently added independently of the receiver manufacturer. Different functions or applications are added at different times. The source codes of the different applications may be proprietary, but the public software interface allows the applications to all operate on the navigation receiver. The navigation receiver manufacturer may not be able to access an added application.

The software interface is published as a public firmware image with undefined functions to be linked with one or more additional modules to successfully execute. The public firmware image is a partial firmware image (i.e., a firmware image with unresolved symbols). The public firmware image is inoperable without linking to one or more additional modules, such as added applications. The public firmware image may include a core navigation component or define interactions with the core navigation features. The core navigation features are operable to be performed by the global navigation satellite system receiver regardless of any linking of undefined functions with the one or more additional modules.

Details of the public software interface are made public. For example, documentation for how to receive and interpret navigation software output is provided with the receiver, upon request, over a computer network or through other sources. The details include tools and/or directions for loading function extension software and/or for compiling function or software extensions on the receiver from source code. Tools and/or directions are provided for linking one or more function extension modules with the partial firmware image. After linking, a complete firmware image results. Directions are textual, visual, audible, or other formats explaining the software interface, extensibility hooks or other aspects for programming, linking, loading or running an application on the receiver. Tools include software for implementing the programming, linking, loading or running of the application with the public software interface.

Any now known or later developed processor or language may be used for compiling, linking, and symbol resolution of an additional application with the navigation receiver. For high-level C code, a firmware image is generated by compiling each individual text source code file to create a binary "object module" using a compiler appropriate to the target processor and operating system. In many embedded systems, there is no separate operating system. In such cases, any necessary facilities otherwise provided by an operating system, such as a scheduler, are built into the embedded firmware image. The resulting object files contain machine code instructions appropriate to the target navigation receiver. Optionally, object modules are grouped together into one or more binary object libraries. The object files and/or libraries are linked together such that all necessary symbols have been resolved. Symbol resolution is done by static linking (e.g., creating a single file that has both the reference and the definition of the symbol), at run time (e.g., all referenced symbols are provided in a set of specified libraries at start of execution), or as needed (e.g., new functions are dynamically loaded).

In act 44, a dynamic loader is provided. Dynamic loading allows a new or added application to be added to already existing applications. The dynamic loader is software, tools or directions for adding functional extensions that adhere to the software interface for running the functional extensions on the processor in the receiver. Public tools and/or directions are provided to load the complete firmware image into the global navigation satellite system receiver. For example, the dynamic loader is dynamic link libraries or additional process executor like the traditional Linux init process. In an alternative embodiment, a non-dynamic loader is provided, such as reprogramming outside of the receiver to integrate the various modules and load as a single program.

The techniques for loading new software depend on the system architecture including the operating system and the software integration technique. In some cases, the new software is linked with all other software to create a single file. In other cases, each new software module is an individual file that is either a standalone application or a library. One technique to load or reload (e.g., reboot) an application file is to use a proprietary serial interface to the receiver. Another technique for receivers with ftp support and Ethernet, serial ppp connections or other network links is to simply ftp (or use scp, http, or another file transfer protocol) the file(s) to a standard location. Another technique that relies on services readily available on embedded Linux devices is to telnet into the receiver, NFS mount a remote server, and copy files from that server. Yet another technique is to put the files on an external USB storage media device and have the receiver look for files in a standard path on that device and automatically copy the files to internal storage. Combinations of these or other now known or later developed techniques for dynamically loading the applications may be used, such as using at least the USB and the ftp methods to dynamically load modules in a same process.

The applications or source code loaded into the receiver for functional extension may be public or proprietary and/or from the same or different companies. Since a public interface is provided, various entities may produce software for running on the navigation receiver. For some functional extensions, the application uses the navigation metrics or information derived from one or more core navigation features. Access to the navigation metrics is provided as part of the software interface. Similarly, the added applications have direct or indirect access to one or more receiver output interfaces, such as an interface for driving a display or data output. The navigation software and any added functional extensions share the output interfaces.

In act 46, a recovery mechanism is provided in the receiver. The error recovery is part of the basic proprietary firmware or image, or part of the public software interface. The error recovery is performed automatically in response to a trigger or in response to a user input requesting error recovery. The error recovery process prevents a buggy software module or application from irrecoverably hanging the system. In one embodiment, the recovery mechanism does not require opening the receiver housing, but opening the housing for recovery may be provided. For example, the system searches in a standard location on an external storage device (e.g., USB) for a script or executable that reloads the application software before any application software is executed. Other techniques include accessing a JTAG or similar debug port on the processor and overwriting the buggy software, or accessing a switch that reverts to a safe image. Another technique is a small independent reload program run before any application software.

In act 50, a program is loaded with the dynamic loader. For example, a program developer uses public tools, directions and/or software interface to load the complete firmware image into the global navigation satellite system receiver. The complete firmware image includes the code for the new application. As another example, the program is loaded using any of the dynamic or other loading techniques discussed herein. The application is loaded by a user or owner of the receiver, by the manufacturer of the receiver or by the developer of the added application. The loading is performed prior to or after sale or purchase of the receiver. Users of the receiver may be able to pick and choose available add on applications for use on the receiver. The open nature of the receiver interface allows others to create programs for use on the receiver made by a different entity and/or owned by a different entity.

In act 52, the consistency and/or security of a program is checked during or after loading. For example, a checksum is used to check the consistency of at least one loaded functional extension. As another example, a digital signature or other encryption is checked to guard the loading functionality. To prevent malicious or unintentional modification of the loaded software, a password or other security feature may be added to the software load or reload process. In one embodiment, a digital signature is included with each software extension and signs the software extension with other information (such as priority level) appended to the extension. Multiple users (such as systems_integrator1 and end-user) are defined, and the receiver has the ability to check the signature validity of each user, such as through the use of a public key that is entered by each user under password protection). Optionally, different access levels restrict access to certain priority levels and/or interface devices. A digital signature may obviate the need for a checksum or other consistency check because the signature protects against both an intentional attempt to load bad code and a bit error during code load.

In act 54, the loaded code, such as source code, an application, a functional module, machine code, a library, a complete firmware image or other application on a processor in the global navigation satellite system receiver is implemented. The processor or processors in the receiver run or operate pursuant to the extended function. Outputs based on or independent of navigation metrics are output on or by the receiver. The outputs provide information to a user or control other equipment. Implement or equipment manufactures may provide functional extensions for the receiver to operate the implement, avoiding additional controllers in a vehicle. The extended function may be responsive to user input, such as settings to control the control of equipment or type of output.

For running the extended functionality or the navigation software, a database may be read. For example, a database for operation of at least one of the functional extensions is interfaced to obtain a stored user configuration, such as desired ground speed for a speed control system.

The receiver described herein may be used as an emulator. For example, the receiver connects with a bus for receiving display instructions from different devices. The receiver emulates a standardized display and provides a navigation display, reducing cabin clutter in a vehicle. Any of the features, devices or acts described in U.S. Published Patent Application No. 2006-0271348, the disclosure of which is incorporated herein by reference, may be used.

While the invention has been described above by reference to various embodiments, it should be understood that many changes and modifications can be made without departing from the scope of the invention. For example, different combinations of features may be provided, such as: a GPS receiver with multiple antenna inputs running proprietary signal tracking software developed by one company and application software developed by another company; multi-frequency GPS receiver with multiple antenna inputs running proprietary signal tracking software developed by one company and application software developed by another company; multi-frequency GPS receiver with multiple antenna inputs with proprietary navigation software and means for loading third party application software; multi-frequency GPS receiver with multiple antenna inputs with proprietary navigation software and means for loading third party application software where the API for the third party application software is public; a GPS receiver with proprietary signal tracking software and a public API for running application software on the navigation processor in the receiver; a multi-frequency GPS receiver with proprietary signal tracking software and a public API for running application software on one of the processors in the receiver; a GPS receiver and a display integrated (e.g., within the console of the vehicle with other vehicle components) with a vehicle for running third party application software on the display processor and/or the receiver processor; a GPS receiver with a large (e.g., 12 inches or more) touch screen display running third party application software on the display and/or the receiver processor; a GPS receiver with no mechanism for internal processor battery but powered from the vehicle battery and running third party application software on the GPS receiver's processor; a GPS receiver with an integrated differential correction receiver and running third party application software on the receiver; a GPS receiver with proprietary navigation software, inertial sensors, and a public API for running third party software on the receiver; or a GPS receiver with proprietary navigation software, inertial sensors, a vehicle with an electronic control interface, an interface between the GPS receiver and the electronic control interface, and a public API for running 3rd party software on the receiver, where the API enables access to the vehicle control interface.

It is therefore intended that the foregoing detailed description be regarded as illustrative rather than limiting, and that it be understood that it is the following claims, including all equivalents, that are intended to define the spirit and scope of this invention.

We claim:

1. A method for a satellite navigation system receiver manufacturer to provide functional extensibility to a satellite navigation system receiver, the method comprising:
   providing on the receiver a proprietary receiver firmware component operable to implement a core navigation feature;
   providing on the receiver a software interface to the receiver firmware with extensibility hooks; and
   providing a dynamic loader operable to add functional extensions that adhere to the software interface to run on a processor in the receiver.

2. The method of claim 1 wherein the functional extensions have access to navigation metrics derived form the core navigation feature.

3. The method of claim 1 wherein the receiver is operable to perform the core navigation feature without the functional extensions.

4. The method of claim 1 wherein the functional extensions are implemented as separate processes by the receiver.

5. The method of claim 1 wherein the functional extensions are implemented as dynamically loaded modules into a same process.

6. The method of claim 1 wherein sources for the functional extensions are proprietary to different companies.

7. The method of claim 1 wherein the receiver firmware operable to implement the core navigation feature and the functional extensions both run on the processor in the receiver.

8. The method of claim 1 wherein the functional extensions have direct or indirect access to one or more receiver output interfaces.

9. The method of claim 1 further comprising:
   implementing the core navigation functionality with:
      multi-frequency capability;
      local differential global positioning capability;
      an integrated local differential data link;
      network-based global positioning capability;
      multi-antenna capability; or
      any combination of two or more of the multi-frequency capability, the local differential global positioning capability, the integrated local differential data link, the network-based global positioning capability, and the multi-antenna capability.

10. The method of claim 9 wherein implementing the core navigation functionality comprises implementing with:
    the local differential global positioning capability; and
    the integrated local differential data link.

11. The method of claim 10 wherein implementing the core navigation functionality comprises implementing with the multi-frequency and multi-antenna capabilities.

12. The method of claim 9 wherein implementing the core navigation functionality comprises implementing with multi-frequency capability.

13. The method of claim 9 wherein implementing the core navigation functionality comprises implementing with the multi-antenna capability.

14. The method of claim 9 wherein implementing the core navigation functionality comprises implementing with the network-based global positioning capability.

15. The method of claim 1 further comprising:
    implementing the core navigation functionality with:
       multi-frequency capability;
       environmental robustness; and
       decimeter or better differential global navigation satellite system capability.

16. The method of claim 1 further comprising:
    providing the receiver with the firmware and with a specified environmental robustness.

17. The method of claim 1 further comprising:
    loading a program with the dynamic loader; and
    checking a consistency of the program.

18. The method of claim 1 further comprising:
    loading a program with the dynamic loader; and
    checking a security feature of the program.

19. The method of claim 1 further comprising:
    interfacing a database for operation of at least one of the functional extensions.

20. The method of claim 1 further comprising:
    providing a recovery mechanism operable without opening an enclosure of the receiver.

21. The method of claim 1 wherein the core navigation feature comprises measuring a carrier phase, measuring a code phase, tracking a satellite, satellite acquisition searching, or a combination of two or more of the measuring the carrier phase, the measuring the code phase, the tracking the satellite, and the satellite acquisition searching.

* * * * *